Dec. 17, 1940. J. W. PAGE Re. 21,664

BUCKET

Original Filed March 15, 1933 5 Sheets-Sheet 1

Inventor:
John W. Page,
By Dyrenforth, Lee, Christian & Wiley Attys

Dec. 17, 1940. J. W. PAGE Re. 21,664

BUCKET

Original Filed March 15, 1933 5 Sheets-Sheet 2

Inventor:
John W. Page,
By Dyrnforth, Lee, Christy & Wales,
Attys.

Dec. 17, 1940. J. W. PAGE Re. 21,664

BUCKET

Original Filed March 15, 1933 5 Sheets-Sheet 3

Inventor:
John W. Page,
By Dyrnforth, Lee, Christy & Wiles,
Attys.

BUCKET

Original Filed March 15, 1933 5 Sheets-Sheet 4

Inventor:
John W. Page,
By Dyrnforth, Lee, Chatten & Wilks,
Attys.

BUCKET

Original Filed March 15, 1933 5 Sheets-Sheet 5

Inventor:
John W. Page,
By Dyrnforth, Lee, Christie & Miles,
Attys.

Reissued Dec. 17, 1940

Re. 21,664

UNITED STATES PATENT OFFICE 21,664

BUCKET

John W. Page, Chicago, Ill.

Original No. 1,989,334, dated January 29, 1935, Serial No. 660,960, March 15, 1933. Application for reissue April 20, 1939, Serial No. 269,061

3 Claims. (Cl. 37—135)

This invention relates to improvements in buckets and, more especially, power buckets designed for excavating, digging, scraping, dragging, and the like.

Among the features of my invention is the provision of such a bucket with its forward edges or front end so shaped that it will roll or rock into digging position. As here shown, the forward edges or front are curved. The bucket may be referred to, therefore, as a rocker-type bucket, it being understood that I claim to be the first inventor of this type of bucket.

By the use of my invention, the efficiency of buckets of the character referred to is increased. I have found that the buckets take the load quicker and dig deeper. The invention is of value whether the bucket is used for shallow or deep digging.

Although, in general, my invention contemplates shortly the curving of the forward edges or front end of the bucket, I have found that in connection with this feature, other features of importance may be employed. For example, the front end of the bucket may be weighted, the pulling or drag line may be fastened relatively low and far back, and the front of the bucket may be relatively heavy with respect to the back when the bucket is empty. These things, therefore, are also features of my invention.

Another feature of my invention is the arrangement of the clevis pins on a slant so that the bridle chain connected to the pulling line will not interfere with the proper operation of the bucket.

Another feature of my invention is the provision of a bucket having an arch in front of the attachment of the pulling line. This provides a stronger bucket and eliminates forward edges exposed to damage when the bucket falls on its forward end.

Other features and advantages of my invention will appear more fully as I proceed with my specification.

In those forms of devices embodying the features of my invention shown in the accompanying drawings—

Figure 5:
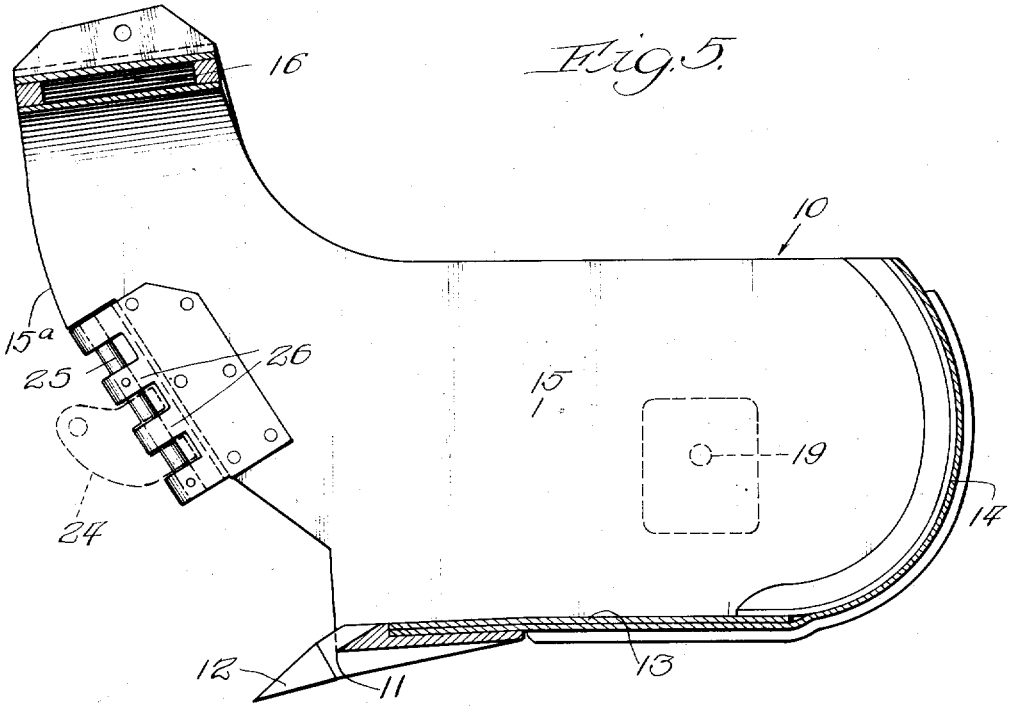
Figure 6:
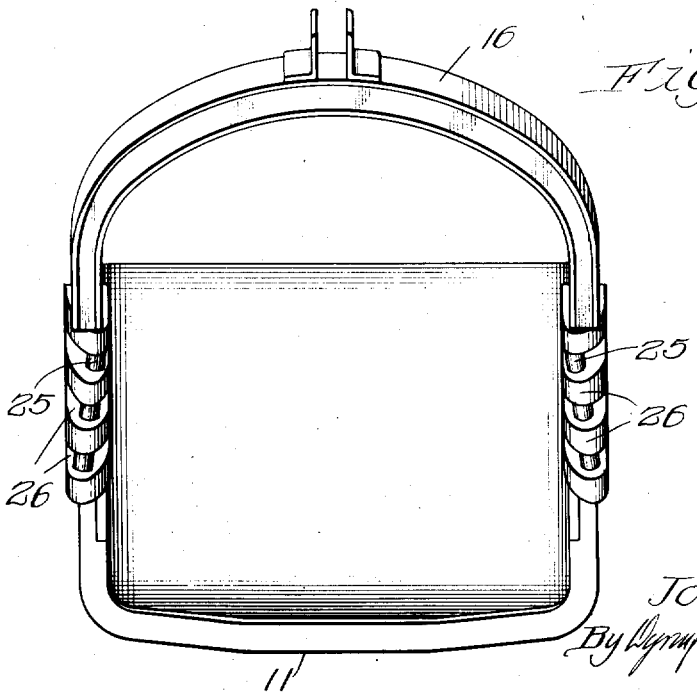
Figure 7:
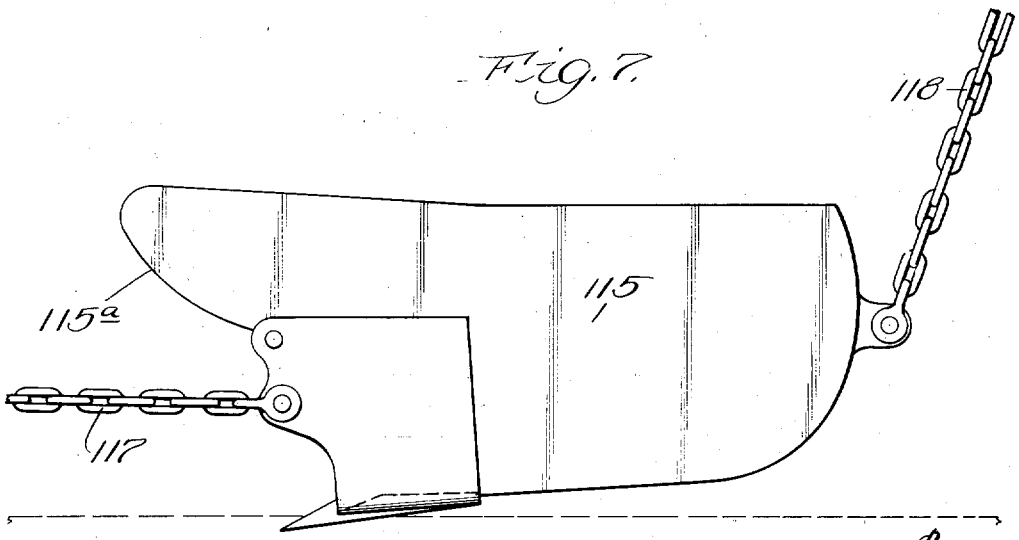
Figure 8:
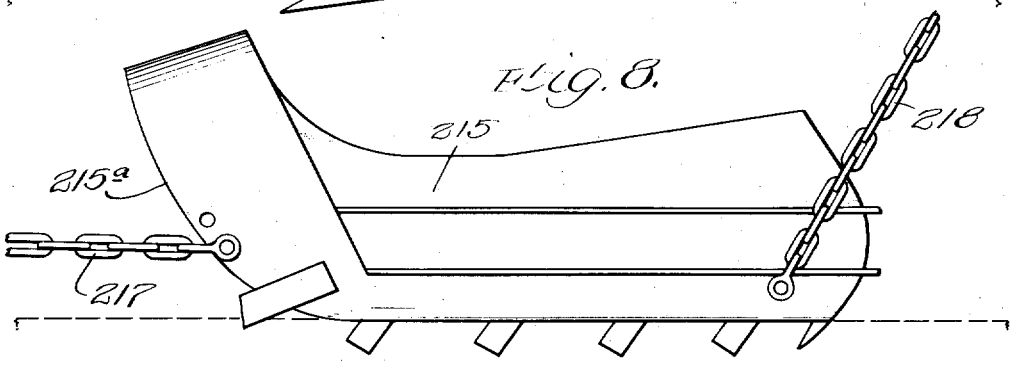
Figure 9:
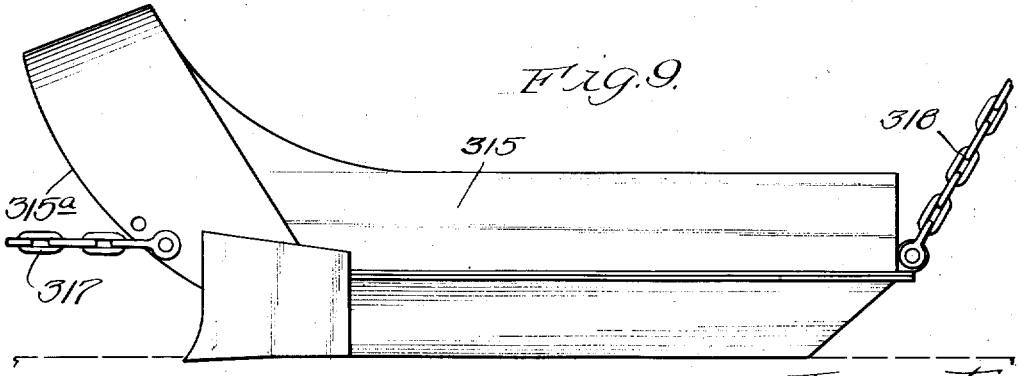
Figure 10:
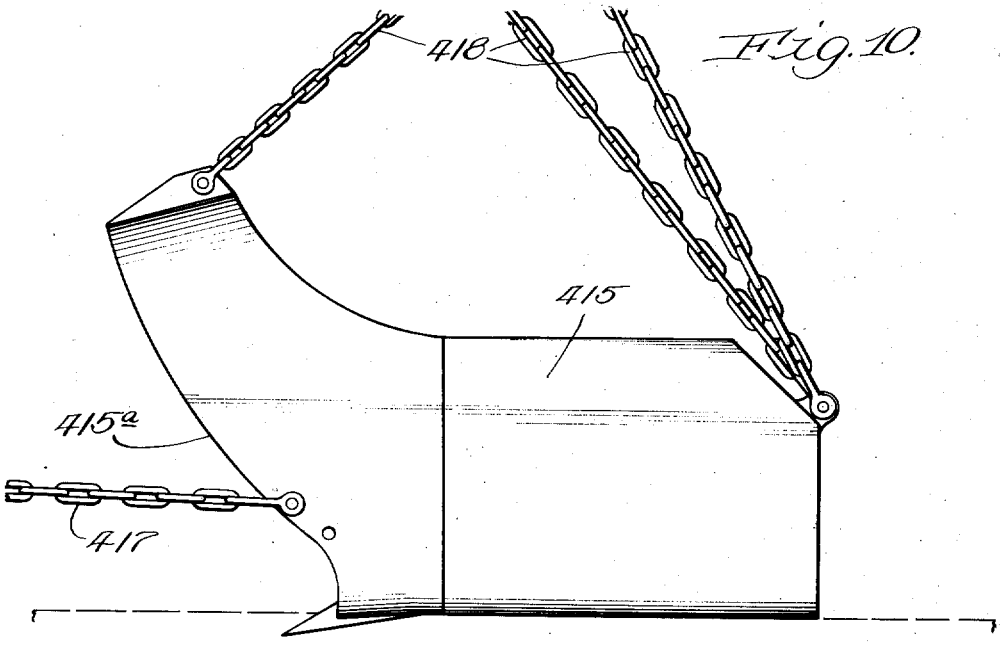
Figure 11:
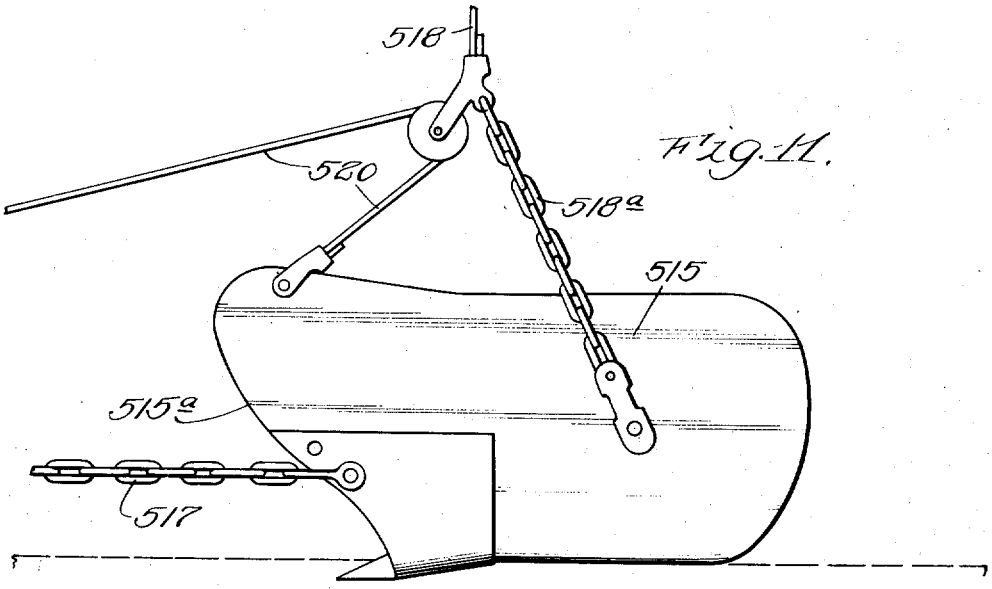

Figures 1 to 4, inclusive, are views in side elevation of the invention applied to a Page bucket, showing the same in various positions; Fig. 5 is a vertical sectional view; Fig. 6 is a view in front elevation of the same; Fig. 7 is a view in side elevation showing the invention applied to a tower excavator bucket; Fig. 8 is a similar view showing a power drag scraper; Fig. 9 shows a power plow scraper; Fig. 10 shows a slack line cableway excavator bucket; Fig. 11 shows a hoodless drag line bucket of the Page type.

I shall first describe in detail the Page bucket shown in Figs. 1 to 6, inclusive. As here shown, the bucket, indicated in general by 10, is provided with the usual cutting lip or forward cutting edge 11 provided with the teeth 12. 13 indicates the bottom of the bucket and 14, the back thereof. The sides of the bucket are indicated by 15.

As here shown, the sides 15 of the bucket are extended forwardly of the cutting lip 11 and curved, as indicated by 15a, to form rockers. The upper forward edges of the sides are connected by the arch 16. 17 indicates the usual loading, pulling or hauling line connected by the bridle chains 17a to the front of the bucket. 18 indicates the lifting or hoisting line connected by the bridle chains 18a to the sides of the bucket, such connections being pivoted at 19. 20 indicates a holding line leading from the hauling line 17 over the sheave 21 to the center of the arch 16, the connection to said arch being pivoted, as indicated by 22. The construction and operation of these lines are well known and need not be described in detail.

Figure 1:
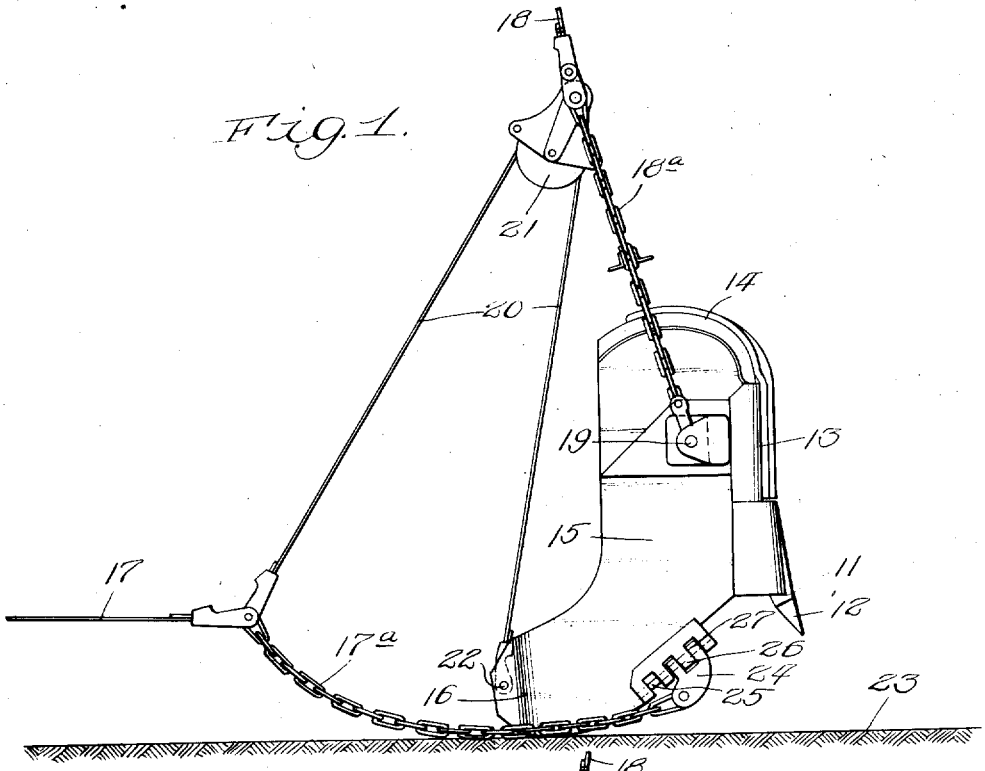

In Fig. 1 is shown an empty bucket in substantially the position occupied by it when it strikes the ground 23 preparatory to taking a load. As soon as the forward edge engages the ground, the bucket will rock or roll backwardly on the curved forward edges or rockers 15a to the position shown in Fig. 2. In this position it will rest in equilibrium on the teeth 12 and the front of the arch; and it will stay in this position even after the hoisting line 18 is slackened. When thus resting, the greater part of the weight of the bucket will be on the teeth. With the older types of bucket it is difficult or impossible to get the bucket to rest in a position, with the hoist line slackened, with any substantial part of its weight on the teeth. A bucket embodying my invention which can be placed on its teeth (with a substantial part of the weight of the bucket on the teeth) will dig much deeper, much harder material and load much quicker than one that has to be dragged before a substantial part of its weight can be concentrated on the tooth points. The downward and rearward slant of the hitch plate pins 25 also permits or aids the bucket to stand in the position shown in Fig. 2 with the hoist line slackened. In this position, these pins are substantially parallel with the ground. If the pins were not thus slanted, the forward end of the bucket could not be cut away to create the rocker effect, and also permit the bucket to stand on its teeth.

Figure 2:
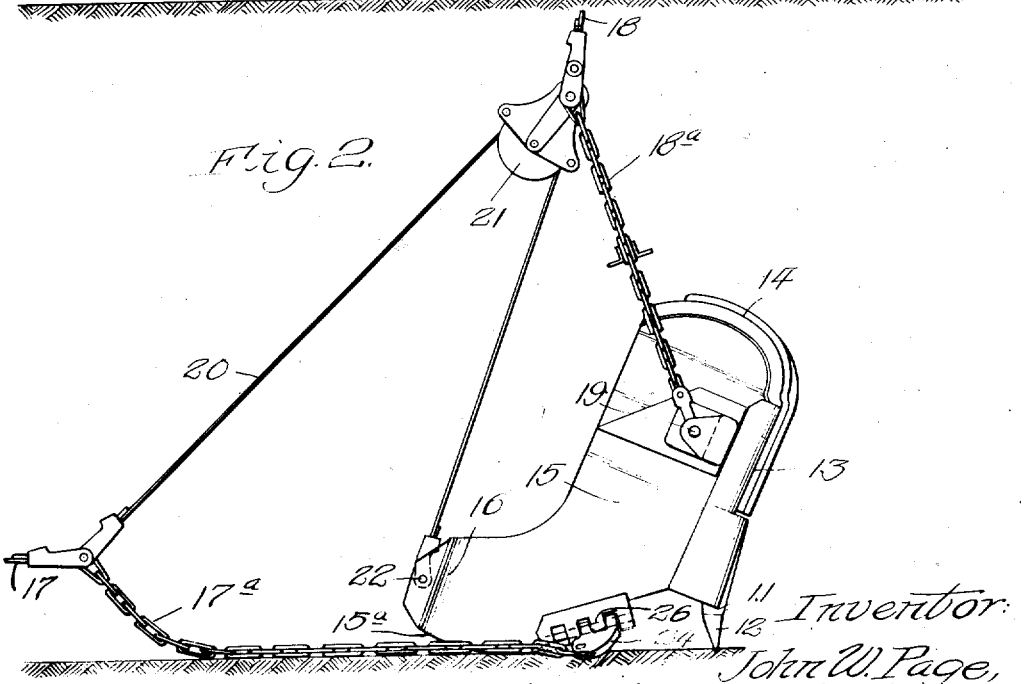

It will be seen from the drawings that when the bucket is in the position shown in Fig. 2, the two bridle chains 17a (attached to the pulling line 17) have their ends (where attached to the clevises 24) at the ground level.

Figure 3:
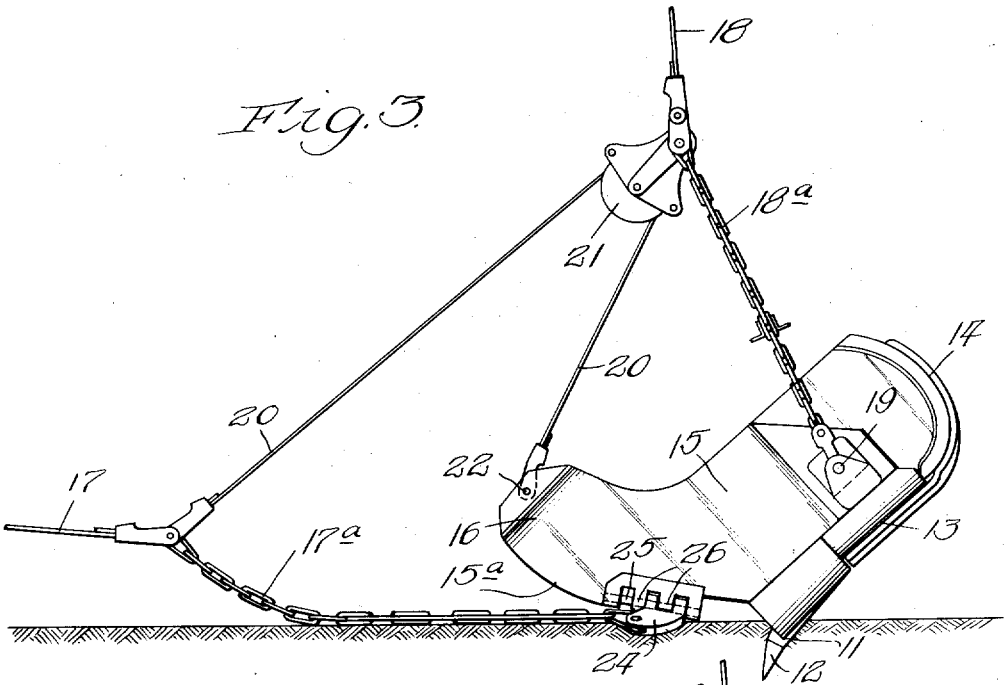
Figure 4:
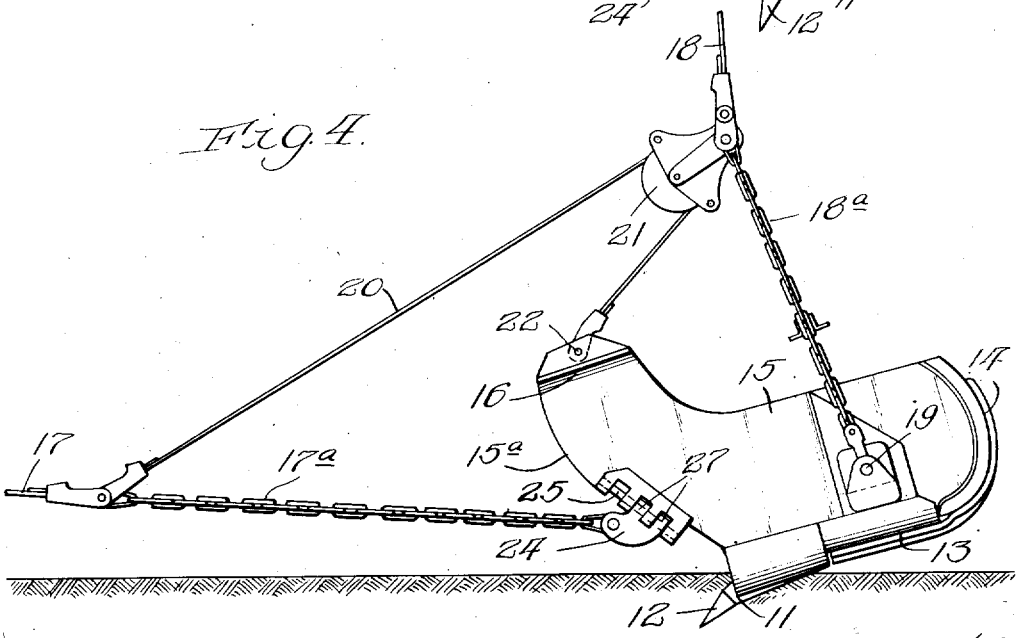

After the bucket is in the digging position shown in Fig. 2, tension may be put on the pulling line 17, whereupon the teeth will dig into the ground and the bucket will assume the position shown in Fig. 3 or Fig. 4, or sequentially the position shown in Fig. 3 and then the position shown in Fig. 4. Further pulling will cause the bucket to take its load.

Each of the two bridle chains 17ᵃ is attached to a clevis 24. The clevis on each side of the bucket is pivoted on a pivot pin 25 mounted in the four separated loops or bearings 26, 26. The clevis 24 is provided with two loops 27, 27 engaging the pin 25. This permits vertical adjustment of the clevis into various positions. It is to be particularly noted, also, that the clevis pins 25, 25 are slanted or battered upwardly and inwardly, as best shown in Fig. 6. This slant or batter is substantially the same as the taper or slant of the two bridle chains 17ᵃ. In other words, each pin has the same batter or slant with respect to the vertical as each chain 17ᵃ has with respect to the center line of the bucket. Because of this construction, tension of the chains 17ᵃ does not interfere with the operation of the bucket as the same rotates upon the pivotal supports 19.

In Fig. 7, the rocker front 115ᵃ is shown applied to a tower excavator bucket. Here the pulling line is indicated by 117 and 118 indicates the hoisting line. The sides of the bucket are indicated by 115. The details of this bucket need not be shown and it is to be understood that the same may be made either with or without a bottom.

Fig. 8 shows the rocker front 215ᵃ applied to a power drag scraper or bucket. Here the pulling line is indicated by 217 and the hoisting line, by 218.

In Fig. 9, the rocker front 315ᵃ is shown applied to a power plow scraper and again 317 indicates the pulling line and 318 the hoisting line.

In Fig. 10, I have shown a slack line cableway excavator bucket with a rocker front 415ᵃ. In this device, the pulling or loading line is indicated by 417. 418, 418 indicate the hoisting lines.

In Fig. 11, I have shown a hoodless drag line Page bucket with a rocker front 515ᵃ applied thereto. 517 indicates the pulling line or loading line. The holding line is indicated by 520 and the lifting line, by 518, the latter being connected to the bucket by the bridle chains 518ᵃ in the usual manner. The bucket shown in Fig. 11 is different from the bucket shown in Figs. 1 to 6, inclusive, principally in not having an arch or hood. It is to be understood, therefore, that there are two holding lines 520, one attached to each side of the bucket, instead of a single line 20 attached to the center of the arch, as shown in the device of Figs. 1 to 6.

It is to be noted, also, that the front of the bucket is relatively heavy with respect to the back when the bucket is empty. To this end, the forward part of the bucket may be weighted. For example, the arch 16 may furnish such weight. This construction moves the center of gravity of the bucket forwardly somewhat so that after the bucket rolls back into digging position, as shown in Fig. 3, the relatively heavy forward end will still keep the bucket (when empty) tilted forwardly somewhat so that it will readily dig down into the ground and take a load when pulled forward. After the bucket gets its load, the center of gravity will be shifted backwardly somewhat so that there will not be so much tendency for the bucket to dip forwardly and spill the load. Of course, the tension on the pulling line 17 and the holding line 20 will assist in preventing the spilling of the load.

As stated above Fig. 1 shows the position occupied by the bucket when it strikes the ground 23 preparatory to taking the load. When dragged forwardly from such position it will assume the positions in Figs. 2, 3 and 4 in sequence as described above. Further pulling will cause the bucket to take its load. In other words, after the bucket is in the position shown in Fig. 2 and when dragged forwardly from such position, it will rock backwardly only to digging position on its teeth as shown in Figs. 3 and 4. In other words, when the loading or hauling line 17 is tightened after the bucket is in the position shown in Fig. 2, it will not rock backwardly all the way to rest upon its bottom 13 and then come up into digging position on its teeth; but from the position resting on its upper forward end and its teeth as shown in Fig. 2 and when dragged forwardly from such position by tension on the loading or hauling line 17 it will rock backwardly from such position of Fig. 2 only to digging position on its teeth. Of course, after the bucket has taken its load it may settle back on its bottom 13. The positions and movements of the bucket just described are accomplished by proper weighting and balancing of the bucket.

While I have shown and described certain embodiments of my invention, it is to be understood that it is capable of many modifications. Changes, therefore, in the construction and arrangement may be made without departing from the spirit and scope of the invention as disclosed in the appended claims, in which it is my invention to claim all novelty inherent in my invention as broadly as permissible, in view of the prior art.

What I regard as new, and desire to secure by Letters Patent, is:

1. A bucket of the character described, provided with cutting teeth, said bucket being so shaped that it will rest in equilibrium on its upper forward end and its teeth with a preponderance of its weight on the teeth when so resting, and so weighted and balanced that when dragged forwardly from such position it will rock backwardly only to digging position on its teeth until it has taken its load.

2. A bucket of the character described, provided with cutting teeth, said bucket being so shaped that it will rest in equilibrium on its upper forward end and its teeth with a preponderance of its weight on the teeth and the ends of the loading line where attached to the bucket substantially at the ground level when so resting, said bucket being so weighted and balanced that when dragged forwardly from such position it will rock backwardly only to digging position on its teeth until it has taken its load.

3. A bucket of the character described, provided with cutting teeth, said bucket being so shaped that it will rest in equilibrium on its upper forward end and its teeth with a preponderance of its weight on the teeth and the ends of the loading line where attached to the bucket substantially at the ground level when so resting, said bucket being so weighted and balanced that when dragged forwardly from such position it will rock backwardly only to digging position on its teeth until it has taken its load, said attachment of the ends of the loading line lying above and substantially in front of the cutting teeth when the bucket is in its horizontal position.

JOHN W. PAGE.